United States Patent
Werner et al.

(10) Patent No.: US 6,855,042 B1
(45) Date of Patent: Feb. 15, 2005

(54) RETAINING DEVICE FOR A BLOCK OR SUCTION ELEMENT

(75) Inventors: Ralf Werner, Hilden (DE); Fritz Kötting, Dormagen (DE)

(73) Assignee: Wernicke & Co. GmbH (DE)

( * ) Notice: Subject to any disclaimer, the term of this patent is extended or adjusted under 35 U.S.C. 154(b) by 342 days.

(21) Appl. No.: 10/130,162
(22) PCT Filed: Oct. 30, 2000
(86) PCT No.: PCT/EP00/10666
  § 371 (c)(1),
  (2), (4) Date: Aug. 20, 2002
(87) PCT Pub. No.: WO01/36155
  PCT Pub. Date: May 25, 2001

(30) Foreign Application Priority Data

Nov. 15, 1999 (DE) .......... 199 54 761

(51) Int. Cl.[7] .............................. B24B 41/06
(52) U.S. Cl. .................. 451/390; 451/384; 451/388; 451/460
(58) Field of Search .............. 451/390, 384, 451/388, 289, 42, 460

(56) References Cited

U.S. PATENT DOCUMENTS

| | | | |
|---|---|---|---|
| 2,383,131 A | * | 8/1945 | Kirsch .................. 451/385 |
| 3,134,208 A | | 5/1964 | Richmond .............. 51/235 |
| 3,804,153 A | | 4/1974 | Tagnon ................. 164/332 |
| 4,118,898 A | | 10/1978 | Godot |

FOREIGN PATENT DOCUMENTS

| | | |
|---|---|---|
| DE | 2245841 | 4/1973 |
| DE | 2245841 | 8/1974 |
| DE | 2621891 | 12/1977 |
| DE | 4230610 | 4/1993 |
| FR | 2226824 | 11/1974 |

* cited by examiner

Primary Examiner—Robert A. Rose
(74) Attorney, Agent, or Firm—Osterlenk, Faber, Gerb & Soffen, LLP

(57) ABSTRACT

Retaining device (1) for a block or suction element (10) in a centering device for spectacle lenses, having a support, which has a longitudinal axis (2), having a spherically dome-shaped bearing surface (3) on the support, having a spherical dome (5), which is mounted cardanically on the support and is complementary to the bearing surface, having a holding element (6) in the spherical dome for the block or suction element with a contact surface (11) for the spectacle lens, and having a radius (R) of the bearing surface and of the spherical dome, the mid-point (M) of which is located on the longitudinal axis of the support (1) on the contact surface for the spectacle lens.

4 Claims, 2 Drawing Sheets

RETAINING DEVICE FOR A BLOCK OR SUCTION ELEMENT

Figure 1:
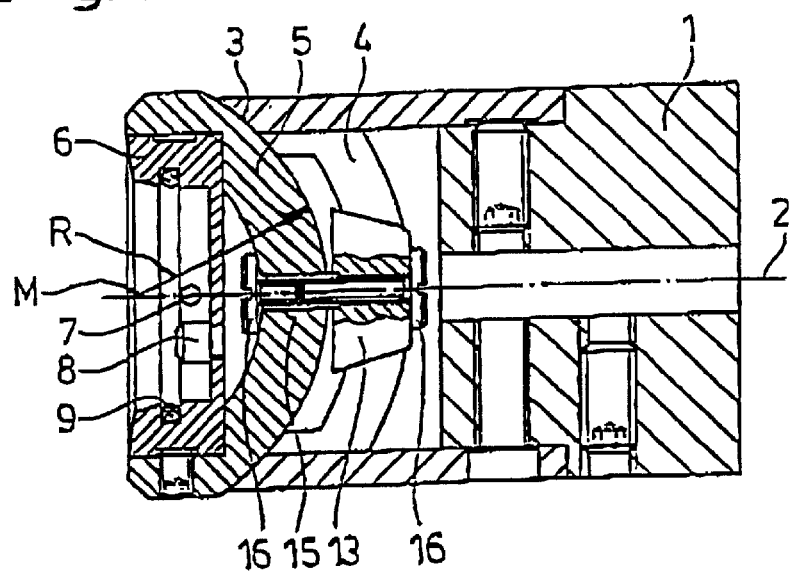

The invention relates to a retaining device for a block or suction element in a centering device for spectacle lenses. A retaining device having a support, which has a longitudinal axis, having a spherically dome-shaped bearing surface on the support, having a spherical dome, which is mounted on the support by means of links and is complementary to the bearing surface, having a holding element in the spherical dome, which is used as a casting mold for casting a block on the spectacle lens, having a contact surface for an unprocessed lens, and having a radius R of the bearing surface and of the spherical dome, the mid-point M of which is located on the longitudinal axis of the support on the contact surface for the unprocessed lens of this kind is described in DE-B 2 245 841.

Centering devices for spectacle lenses are used to mount a block or suction element off-axis by the amount of the decentration at the correct angle on a surface, generally the convex front side of an unprocessed lens, after which the unprocessed lens is inserted at the correct angle into a spectacle-lens holding shaft of a spectacle-lens rim grinding machine by means of the block or suction element and its rim is machined to match the predetermined shape of spectacle frames.

In another known, commercially available centering device, an unprocessed lens is centered as regards its geometrical axis and aligned perpendicular to the viewing axis as regards its convex front side in order to determine its optical properties. A cross-line screen is then projected through the unprocessed lens and the image of the cross-line screen, which has been distorted in accordance with the optical properties of the unprocessed lens, is recorded by a camera and used to calculate the optical properties of the unprocessed lens since there is a clear mathematical relationship between the distorted image of the cross-line screen and the optical properties of the unprocessed lens. Analysis of the image for the unprocessed lens inserted without angular alignment into the centering device also gives the axis position of a cylindrical or prismatic grinding cut or the position of a near portion, which determines the angular position of a block or suction element to be placed on the unprocessed lens in addition to the predetermined decentration.

After these parameters have been determined, a device for placing the block or suction element on the surface of the unprocessed lens is controlled in terms of the angular position and decentration, and the block or suction element is fixed at the correct angle at the predetermined point on the surface of the unprocessed lens.

The fact that the block or suction element is generally fixed off-axis relative to the optical axis of the unprocessed lens results in skewing of the block or suction element on the convex surface of the unprocessed lens, which impairs the accuracy of positioning of the block or suction element.

Accordingly, the object underlying the invention is to provide a retaining device for a block or suction element in a centering device for spectacle lenses, by means of which a block or suction element can be placed and fixed with high precision and at the correct angle on an optical surface of an unprocessed lens for subsequent machining of the rim.

Starting from this problem, the solution provided is that, in the case of a retaining device for a block or suction element in a centering device for spectacle lenses in accordance with the precharacterizing clause of claim 1, the invention proposes cardanic mounting of the spherical dome on the support by means of a first slotted guide for a sliding block, said guide extending perpendicularly to the longitudinal axis in the support, and by means of a further, second slotted guide in the spherical dome for a second sliding block, said guide extending perpendicularly to the first slotted guide, the sliding blocks forming a nonrotatable connection between the spherical dome and the support.

By virtue of this arrangement, the mid-point of the block or suction element always remains on the longitudinal axis of the support, irrespective of the respective skewing of the block or suction element and irrespective of the angular position of the support in relation to the course of the axis of a cylindrical or prismatic grinding cut or the position of a near portion.

By virtue of the nonrotatable connection and devices in the holding element in the spherical dome for holding a block or suction element at the correct angle, the block or suction element can be placed on the optical surface of the unprocessed lens at a predeterminable angle relative to the latter by turning the support.

For automatic positioning and placement of the block or suction element at the correct angle on the unprocessed lens, the support can be arranged in the centering device in such a way that it can be rotated by being driven and that it can be displaced in all directions perpendicularly to its axis by being driven.

Figure 2:
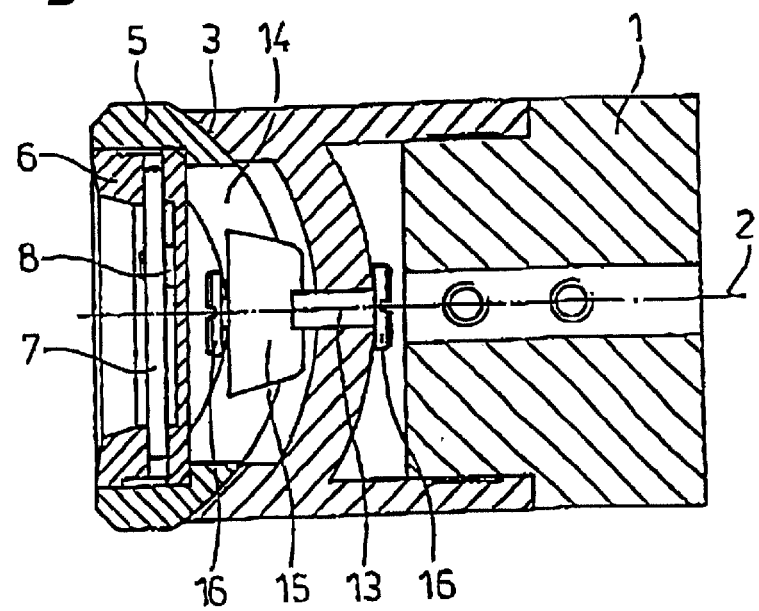
Figure 3:
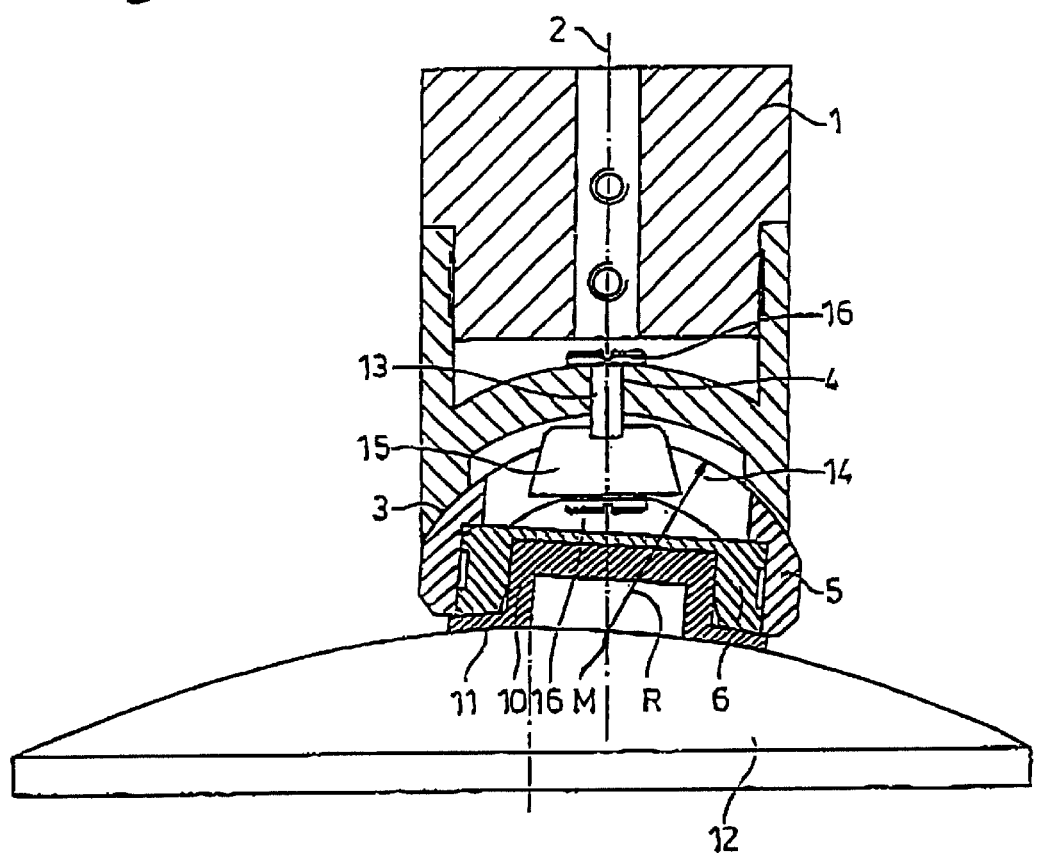

The invention is explained in greater detail below with reference to an exemplary embodiment illustrated in the drawing, in which:

FIG. 1 shows a longitudinal section through the retaining device according to the invention, FIG. 2 shows a longitudinal section through the retaining device according to the invention, rotated through 900 relative to the illustration in FIG. 1, and FIG. 3 shows a retaining device according to the invention in longitudinal section with an inserted block or suction element and an illustration of its placement on an unprocessed lens.

The only part of a centering device for spectacle lenses that is illustrated is a retaining device 1, which can be rotated about a longitudinal axis 2 by being driven in a controlled manner and can be displaced in a controlled manner in all directions perpendicularly to this longitudinal axis 2 by being driven. At one end, the support has a spherically dome-shaped annular bearing surface 3 and is provided on its inside with a first slotted guide 4, which extends perpendicularly to the longitudinal axis 2. A spherical dome 5, which is complementary to the bearing surface and is provided with a holding element 6 for a block or suction element 10, rests on the bearing surface 3.

To allow the block or suction element 10 to be held at the correct angle, the holding element 6 is provided with a pin 7 extending transversely to the axis 2 and with a stud 8, which is parallel to said pin and arranged off-axis. The block or suction element 10 has corresponding complementary recesses, ensuring that it can be inserted into the holding element 6 only in a defined angular position. The block or suction element 10 is clamped in the holding element 6 by means of an O-ring 9. The block or suction element 10 has a contact surface 11 for an unprocessed lens 12, the surface either being provided with an adhesive film, ensuring that the unprocessed lens 12 sticks to it when the block or suction element 10 is placed on, or the block or suction element being elastically deformable in such a way that it adheres to the surface of the unprocessed lens 12 by suction.

A sliding block 13 is guided in the slotted guide 4 and is connected nonrotatably, by means of a screwed joint 16, to a second sliding block 15 arranged perpendicularly thereto. The second sliding block 15 is guided in a second slotted guide 14 in the spherical dome 5, providing cardanic mounting for the spherical dome 5 in a manner that prevents rotation relative to the support 1.

The radius R of the spherically dome-shaped bearing surface 3 and of the spherical dome 5 is dimensioned in such a way that its mid-point M is located on the longitudinal axis 2 of the support 2, on the bearing surface 11 for the unprocessed lens 12.

As can be seen in FIG. 3, this ensures that the central bearing point of the block or suction element 10 is always precisely on the longitudinal axis 2 on the surface of the unprocessed lens 12, irrespective of its angular position, eliminating the possibility that there might be inaccuracies when mounting and fixing the block or suction element 10 owing to any skewing of the block or suction element 10.

What is claimed is:

1. A retaining device for a block or suction element (10) in a centering device for spectacle lenses, having
   a support (1), which has a longitudinal axis (2),
   a spherically dome-shaped bearing surface (3) on the support (1),
   a spherical dome (5), which is mounted on the support (1) and is complementary to the bearing surface (3),
   a holding element (6) in the spherical dome (5) for the block or suction element (10) with a contact surface (11) for an unprocessed lens (12), and
   a radius (R) of the bearing surface (3) and of the spherical dome (5), the mid-point (M) of which is located on the longitudinal axis (2) of the support (1), on the contact surface (11) for the unprocessed lens (12),
   characterized by cardanic mounting of the spherical dome (3) on the support (1) by means of a first slotted guide (4) for a sliding block (13), said guide extending perpendicularly to the longitudinal axis (2) in the support (1), and by means of a further, second slotted guide (14) in the spherical dome (5) for a second sliding block (15), said guide extending perpendicularly to the first slotted guide (4), the sliding blocks (13, 15) forming a nonrotatable connection between the spherical dome (5) and the support (1).

2. The retaining device as claimed in claim 1, in which the holding element (6) in the spherical dome (5) has devices (7, 8) for holding a block or suction element (10) at the correct angle.

3. The retaining device as claimed in claim 1, in which the support (1) is arranged in the centering device in such a way that it can be rotated by being driven in a controlled manner and that it can be displaced in all directions perpendicularly to its axis (2) by being driven.

4. The retaining device as claimed in claim 2, in which the support (1) is arranged in the centering device in such a way that it can be rotated by being driven in a controlled manner and that it can be displaced in all directions perpendicularly to its axis (2) by being driven.

* * * * *